(12) United States Patent
Ha

(10) Patent No.: US 7,826,021 B2
(45) Date of Patent: Nov. 2, 2010

(54) SUBSTRATE FOR LIQUID CRYSTAL DISPLAY

(75) Inventor: Kyoung Su Ha, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/686,206

(22) Filed: Jan. 12, 2010

(65) Prior Publication Data

US 2010/0112740 A1    May 6, 2010

Related U.S. Application Data

(62) Division of application No. 10/329,470, filed on Dec. 27, 2002, now Pat. No. 7,671,953.

(30) Foreign Application Priority Data

Apr. 17, 2002 (KR) ............................. 20939/2002

(51) Int. Cl.
*G02F 1/1343* (2006.01)

(52) U.S. Cl. .................................... 349/139

(58) Field of Classification Search ........................ None
See application file for complete search history.

(56) References Cited

U.S. PATENT DOCUMENTS

| 4,913,531 A | 4/1990 | Efron et al. |
| 5,214,521 A | 5/1993 | Kwon et al. |
| 5,317,432 A * | 5/1994 | Ino ............................. 349/39 |
| 5,398,127 A | 3/1995 | Kubota et al. |
| 5,892,558 A | 4/1999 | Ge et al. |
| 6,317,175 B1 | 11/2001 | Salerno et al. |
| 6,610,997 B2 | 8/2003 | Murade |
| 6,628,367 B2 | 9/2003 | Hirabayashi et al. |
| 6,683,592 B1 | 1/2004 | Murade |
| 6,762,809 B1 | 7/2004 | Murade |

FOREIGN PATENT DOCUMENTS

| JP | 06-082832 | 3/1994 |
| KR | 2002/002656 A | 1/2002 |

\* cited by examiner

*Primary Examiner*—Timothy Rude
(74) *Attorney, Agent, or Firm*—Birch, Stewart, Kolasch & Birch, LLP

(57) ABSTRACT

A method of manufacturing a substrate for a liquid crystal display. The method includes forming a plurality of first line-shaped fine grooves parallel to each other in a lengthwise direction and a plurality of second line-shaped fine grooves parallel to each other in a width direction on the substrate, forming an inorganic insulating film on the substrate including the first and second line-shaped fine grooves, forming a plurality of gate lines within the first line-shaped fine grooves, forming a plurality of data lines that contacts an upper surface of the inorganic insulating film within the second line-shaped fine grooves, and forming a passivation layer on the substrate including the data lines.

1 Claim, 5 Drawing Sheets

SUBSTRATE FOR LIQUID CRYSTAL DISPLAY

CROSS REFERENCE TO RELATED APPLICATIONS

This is a divisional of U.S. application Ser. No. 10/329,470 filed on Dec. 27, 2002 now U.S. Pat. No. 7,671,953, which claims priority under 35 U.S.C. §119(a) on Patent Application No. 20939/2002 filed in Korea on Apr. 17, 2002, all of which are herein incorporated by reference.

BACKGROUND OF THE INVENTION

1. Field of the Invention

The present invention relates to a substrate for a liquid crystal display, and more particularly, to a substrate for a liquid crystal display in which metal lines including a gate line and a data line are formed to be suitable for realizing a high resolution in a large-sized screen.

2. Discussion of the Background Art

Generally, a liquid crystal display (LCD) includes a TFT (thin film transistor) array substrate on which thin film transistors (TFTs) and pixel electrodes are arranged and a color filter substrate facing the TFT array substrate on which color filters and a common electrode are formed, and a liquid crystal injected into a space between the TFT array substrate and the color filter substrate. These LCDs display images by using an optical switching property of the liquid crystal interposed between the two substrates. In recent times, LCDs are increasing in popularity as a next generation display device to replace the cathode ray tube (CRT) because of their light weight and slim characteristics.

FIG. 1 is a plan view schematically showing a configuration of metal lines formed on a substrate for an LCD.

As shown in FIG. 1, a plurality of metal lines are formed on a substrate for an LCD. For instance, the metal lines include a plurality of gate lines $110a$ to $110n$ (110) formed in a length direction and a plurality of data lines $120a$ to $120n$ (120) formed in a width direction and perpendicularly crossed with the gate lines. A plurality of gate line pads $111a$ to $111n$ (111) into which gate driving signals for respective pixels are inputted, are formed at one end of the gate lines 110. A plurality of data line pads $121a$ to $121n$ (121) into which data driving signals for respective pixels are inputted are formed at one end of the data lines 120.

Here, unit pixel 130 is defined as a region in which a pair of gate lines are crossed with a pair of data lines.

In detail, the data lines 110 and the gate lines 120 are made of a conductive material and applies a driving current to the TFT element corresponding to the pixel 130. The data lines 110 and the gate lines 120 are formed by a method including the steps of depositing a metal film and a photoresist film on a substrate on which TFTs are arranged, and selectively removing the photoresist film and the metal film through a photolithography process.

As time progresses, the metal line including these gate lines and data lines is becoming increasingly lengthened according to a trend of increasing the size of LCDs.

FIG. 2 is a perspective view of a metal line to depict the resistance characteristic of the metal line.

When the length of the metal line is l, the sectional area is A, and the conductivity is σ, a total resistance of the metal line R equals to l/σA. Accordingly, if the flowing current is I, a voltage drop $\Delta V$ in the metal line is expressed by the following equation: $\Delta V = iR = il/\sigma A$. This relation means that when the sectional area A (including elements of the thickness and the line width) of the gate line 110 and the data line 120 is constant, the voltage drop $\Delta V$ depends on the respective lengths of the gate line 110 and the data line 120.

As a result, although an equal driving voltage is applied to the gate line pad $111a$ and the data line pad $121a$ from the drive IC (not shown) of the LCD, the voltages applied to the gate line 110 or the data line 120 varies at a specific location depending on the resistance. For example, according to the lengths of the gate lines 110 and the data lines 120, a lower voltage is applied to a pixel (Pn of FIG. 1) further away from the pads $111a$, $121a$ than a pixel (Pa of FIG. 1) placed nearer to the pads $111a$, $121a$. Accordingly, the pixel (Pn of FIG. 1) needs a longer charging time than the pixel (Pa of FIG. 1) when the pixels (Pn and Pa) are charged up to a specific electric charge. In other words, if the resistance increases, the current flowing through under the same voltage decreases, so that the charging time is lengthened.

The extended charging time causes a signal delay phenomenon in which the frequency for driving the LCD panel is lowered.

In order to solve this problem, it is necessary to decrease an overall resistance of the metal line by decreasing the length of the metal line, or increasing the sectional area of the metal line.

However, upon considering the trend in increasing a size of the LCDs, it is substantially difficult to shorten the length of the metal line.

A background art method for increasing the sectional area of the metal line, includes increasing the line width or increasing the thickness of the metal line.

However, if the line width of the metal line increases and the thickness decreases, little improvement in the height difference corresponding to the decrease in the thickness is obtained, but the lowering in the aperture ratio of the pixel due to the increase in the line width results. The lowering phenomenon in the aperture ratio is described with reference to FIG. 3.

FIG. 3a and FIG. 3b are sectional views of substrates for LCDs illustrating the variation in the aperture ratio depending on the increase in the line width of the metal line. Specifically, FIG. 3a shows a status prior to increasing the line width of the metal line, and FIG. 3b shows a status after the line width of the metal line increases.

The metal line for the gate line and the data line are generally made of an opaque metal. To this end, the increase in the line width allows the light transmission area of a substrate 320 to be decreased from L1 to L2. The decrease in the light transmission area causes more of the light irradiated from a backlight to be lost while light is transmitted from the substrate resulting in the aperture ratio of the pixel being lowered.

The occurrence of the aforementioned phenomenon is not restricted only to the transmission type LCD substrate but is applied to the reflection type LCD substrate likewise.

Of course, the problem of lowering in the aperture ratio can be resolved by increasing the thickness of the metal line instead of increasing the line width of the metal line.

FIG. 4 is a schematic view for illustrating that a crack is generated in the inorganic insulating film formed on the metal line.

As shown in FIG. 4, when the thickness of the metal line is increased, a serious height difference is generated between the metal line portion and the non-metal line portion. So, if the inorganic insulating film 330 is further deposited on the metal line 120, a problem occurs in that a crack is generated in the inorganic insulating film 330, so that many defective devices are mass-produced. Hence, the thickness of the metal line cannot be increased above a certain limit.

Because of the above problems, the background art method for forming the metal line has prevented process failures by decreasing the aperture ratio of the pixel so as to solve the signal delay problem.

However, in the manufacturing process of a large-sized, high brightness and high resolution LCD sought after at the present time, there is a problem in applying the aforementioned methods due to a limitation on the application. Especially, in order to realize a large-sized LCD, it is essentially required to decrease the resistance of the metal line.

SUMMARY OF THE INVENTION

To achieve these objects and other advantages and in accordance with the purpose of the invention, as embodied and broadly described herein, there is provided a substrate for a liquid crystal display. The substrate includes: a line-shaped fine groove formed on the substrate; and a metal line at least formed within the fine groove.

In an aspect of the present invention, there is provided a substrate for a liquid crystal display. The substrate includes: a plurality of first line-shaped fine grooves formed parallel to one another in a length direction on the substrate; a plurality of second line-shaped fine grooves formed parallel to one another in a width direction on the substrate; a first metal line at least formed within the first line-shaped fine grooves; and a second metal line at least formed within the second line-shaped fine grooves.

In another aspect of the present invention, there is provided a liquid crystal display. The liquid crystal display includes: a TFT array substrate including thin film transistors, pixel electrodes, a line for supplying current to the thin film transistors, and a fine groove formed on the TFT array substrate and in which the line is received to reduce a height difference between the line and the surface of the TFT array substrate; a color filter substrate facing the TFT array substrate, and on which a color filter and a common electrode are formed; and a liquid crystal layer interposed between the TFT array substrate and the color filter substrate.

According to the above liquid crystal display, it is possible to decrease the resistance of the metal line formed on the substrate.

In addition, the sectional area of the metal line can be increased and the resistance can be decreased, thereby achieving an objective of easily realizing a large-sized LCD.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain principles of the present invention. In the drawings.

DETAILED DESCRIPTION OF PREFERRED EMBODIMENTS

Reference will now be made in detail to a preferred embodiment of the present invention with reference to the attached drawings.

Figure 1:
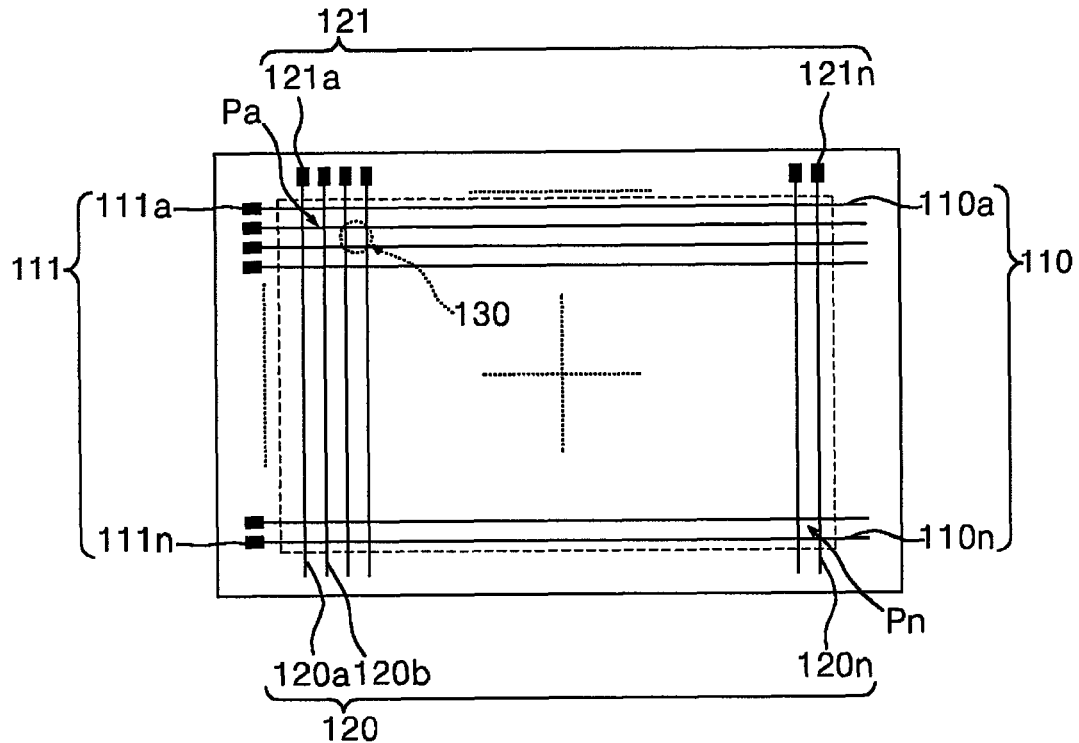
FIG. 1 is a plan view schematically showing a configuration of metal lines formed on a substrate for an LCD.
Figure 2:
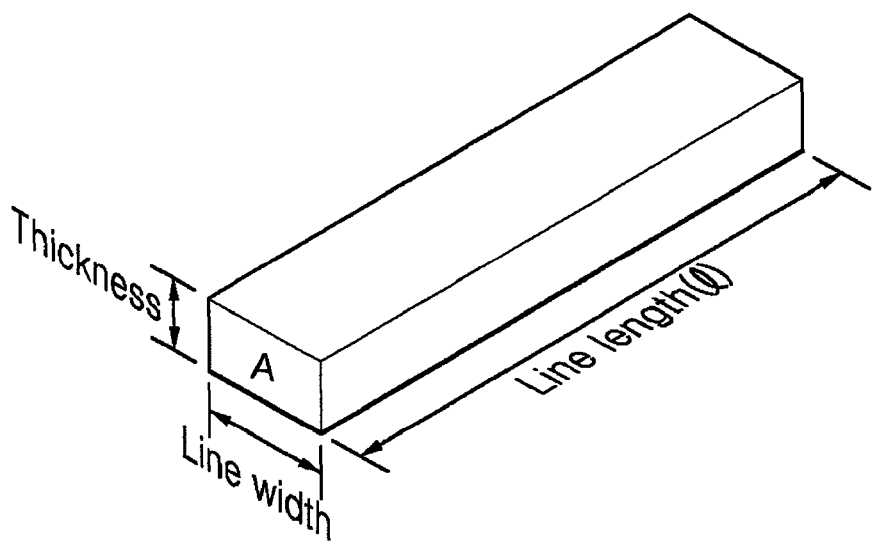
FIG. 2 is a perspective view of a metal line to depict the resistance characteristic of the metal line.
Figure 3A:
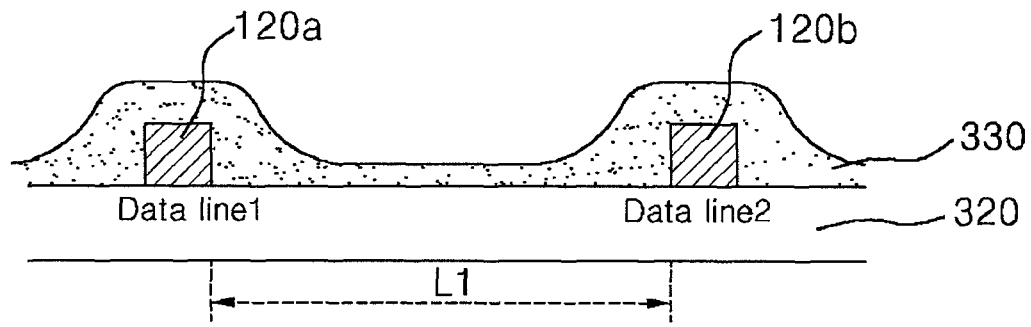
FIG. 3a and FIG. 3b are sectional views of substrates for LCDs illustrating the variation in the aperture ratio depending on the increase in the line width of the metal line.
Figure 3B:
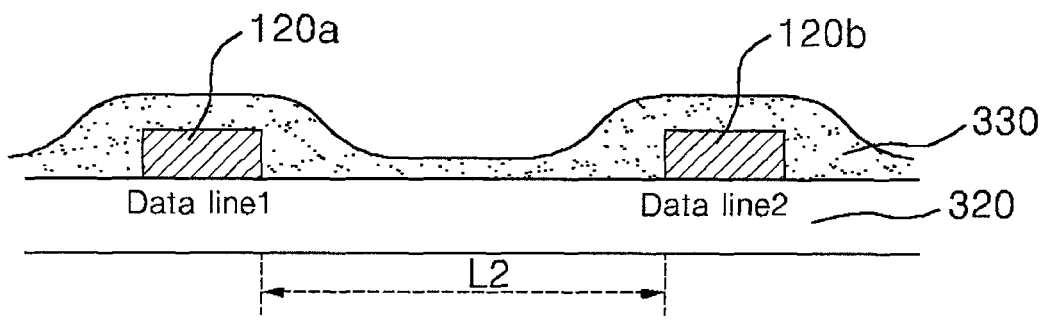
Figure 4:
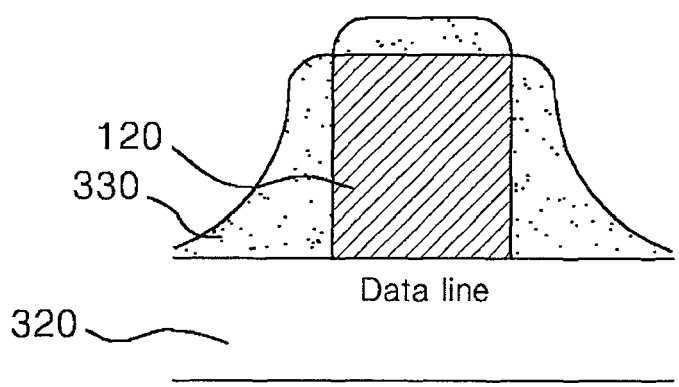
FIG. 4 is a schematic view for illustrating that a crack is generated in the inorganic insulating film formed on the metal line.
Figure 5:
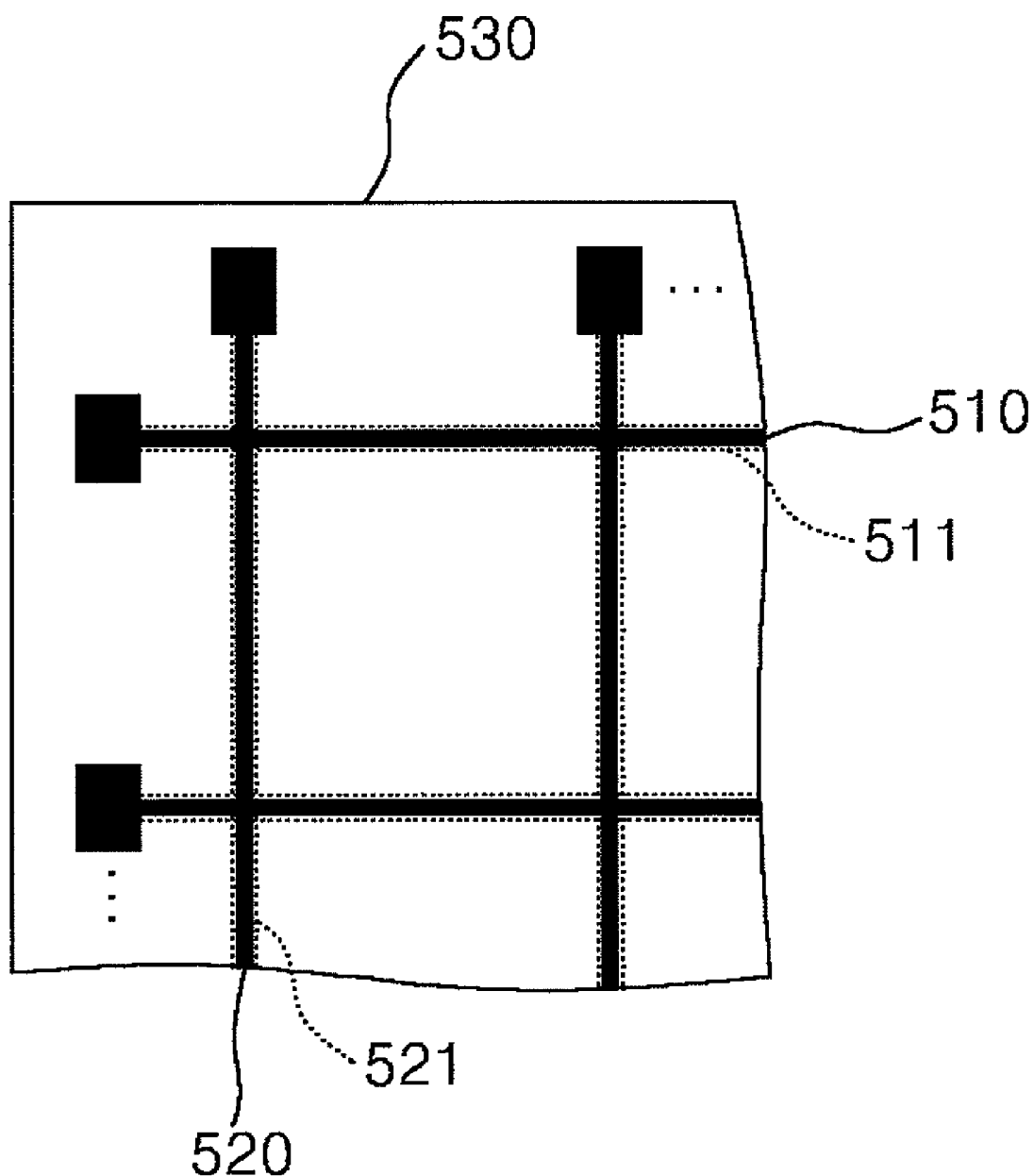
FIG. 5 is a schematic view of metal lines formed on a substrate for a liquid crystal display according to an embodiment of the present invention.

FIG. 5 is a schematic view of metal lines formed on a substrate for a liquid crystal display according to an embodiment of the present invention.

As shown in FIG. 5, a substrate 530 for a liquid crystal display according to the present invention includes a plurality of first fine grooves 511 formed parallel to each other in a length direction on the substrate, and a plurality of second fine grooves 521 formed parallel to each other in a width direction perpendicular to the length direction on the substrate. A first metal line 510 including a gate line is formed at least within the first fine groove and a second metal line 520 including a data line is formed at least within the second fine groove 521.

Width and thickness of the first and second fine grooves 511 and 521 can be concretely determined by the line width and thickness of the first and second metal lines 510 and 520 formed on the first and second fine grooves 511 and 521. For instance, in an LCD of the background art, the first and second metal lines 510 and 520 have a line width ranging from 7 μm to 20 μm and a thickness ranging from 1,000 Å to 4,000 Å. Accordingly, the first and second fine grooves 511 and 521 are also formed to have a line width ranging from 7 μm to 20 μm and a thickness ranging from 1,000 Å to 4,000 Å.

A manufacturing process of the substrate for a liquid crystal display is described with reference to FIG. 6.

FIG. 6 is a schematic sectional view of the first metal line shown in FIG. 5.

Figure 6A:
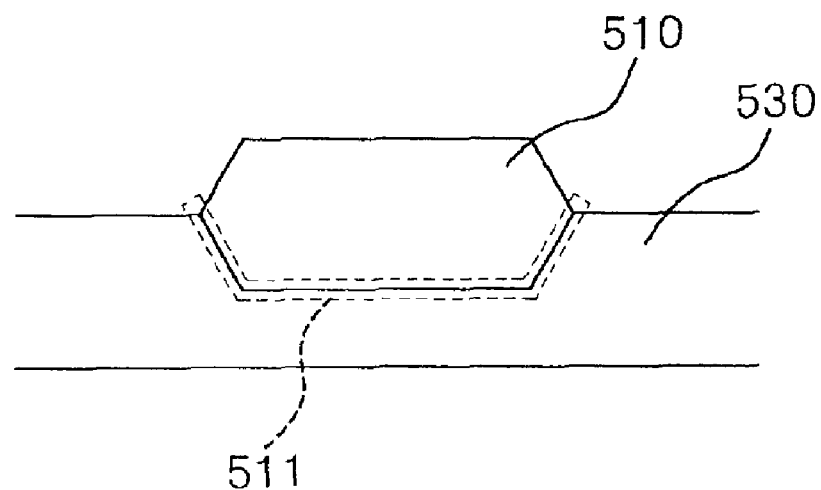
FIG. 6 is a schematic sectional view of the first metal line shown in FIG. 5.

First, referring to FIG. 6a, a substrate 530 for forming TFTs and pixel electrodes is prepared. The substrate 530 is made of glass or plastic. A first fine groove 511 for the formation of a first metal line 510 including a gate line is formed in a length direction on the substrate 530.

In the meanwhile, if the substrate 530 is made of glass, the first fine groove 511 can be formed by an etch process. If the substrate 530 is made of plastic, the first fine groove 511 can be formed by a molding process using a die.

If the first fine groove 511 is formed on the substrate 530 by the etch process or the molding process, a first metal line 510 is formed on the first fine groove 511. In more detail, a conductive material, for instance, aluminum or an aluminum alloy is deposited on the substrate 530, a photoresist film is coated on the conductive material, the photoresist film is patterned by a photolithography process, the underlying conductive material is selectively removed by an etch process with the patterned photoresist film as a mask, and the patterned photoresist film is then removed. The remaining conductive material pattern forms the first metal line 510.

The substrate formed as above does not cause a height difference problem between the uppermost surface of the first metal line 510 and the upper surface of the substrate 530 although it uses a thicker metal line than the metal line of the background art. Also, it is possible to further decrease the height difference by making the first fine groove 511 deeper. In other words, the height difference between the first metal line 510 and the substrate 530 decreases by the thickness of the substrate 530.

Figure 6B:
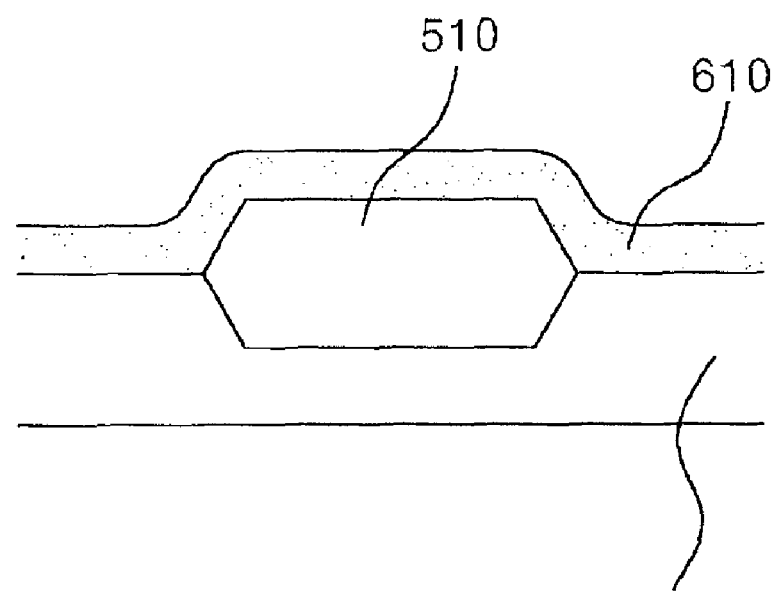

Thus, as the height difference of the metal line 510 decreases, although an upper film such as an inorganic insulating film 610 is formed on the first metal line 510 as shown in FIG. 6*b*, the possibility of a crack occurring in the inorganic insulating film 610 decreases remarkably, such that yield in the manufacturing process of the LCDS is enhanced. In addition, as shown in FIG. 6*b*, since the sidewall of the metal line 510 is formed with a slope, the possibility of a crack occurring further decreases.

Also, since the metal line 510 decreases in line width but increases in thickness, it has an area that is equal to or greater than the area of the metal line in the background art. This means that resistance per unit length of the metal line decreases compared with the resistance of the background art.

In other words, the metal line according to the present invention achieves a low resistance characteristic and accordingly the signal delay and the signal distortion phenomenon due to the voltage drop in the metal line decrease remarkably.

FIG. 7 is a schematic sectional view of the second metal line shown in FIG. 5.

Figure 7A:
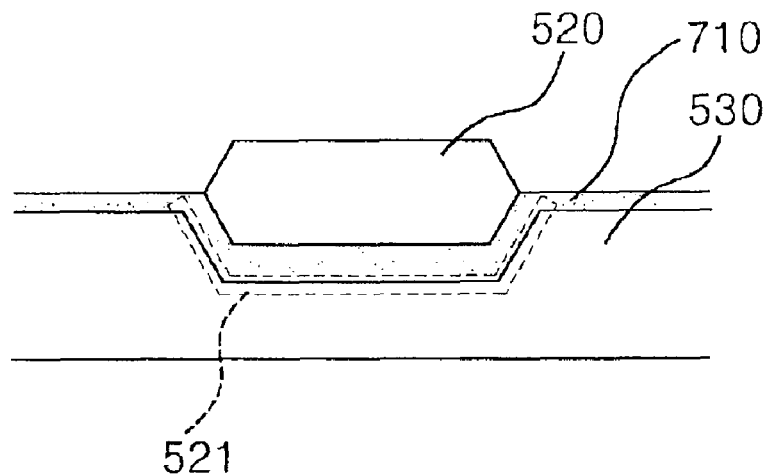
FIG. 7 is a schematic sectional view of the second metal line shown in FIG. 5.
Figure 7B:
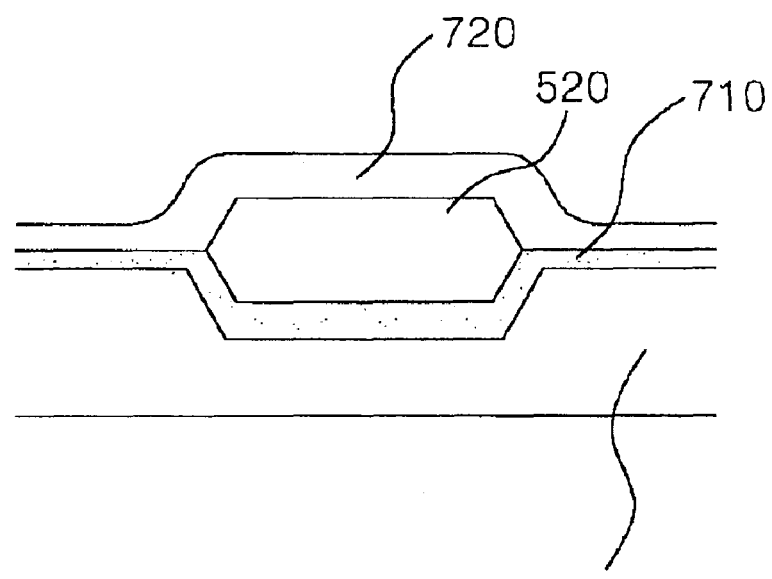

Referring to FIG. 7*a*, a substrate for a liquid crystal display includes a second fine groove 521 formed in a width direction on the substrate, an inorganic insulating film 710 formed on a predetermined portion of the substrate including the second fine groove 521, and a second metal line 520 formed on the inorganic insulating film 710. A passivation layer 720 is further formed on the second metal line 520 and the inorganic insulating film 710 as shown in FIG. 7*b*.

Particularly, the second metal line 520 is formed on the inorganic insulating film 710 as shown in FIG. 7*a*.

Here, the inorganic insulating film 710 is provided to insulate the first metal line 510 (FIG. 5) and the second metal line 520 formed crosswise with the first metal line 510. In more detail, the inorganic insulating film 710 is insertedly formed on a contact surface between the first metal line 510 and the second metal line 520 at the crossing portion of the first metal line 510 and the second metal line 520, but is formed between the second fine groove 521 and the second metal line 520 as shown in FIGS. 7*a* and 7*b* at a region other than the crossing portion.

Since the inorganic insulating film 710 is formed in a recessed shape like the shape of the second fine groove 521, although the second metal line 520 having a thickness greater than that of the background art is formed, the height difference decreases remarkably compared with the height difference in the background art. As a result, although an upper film such as the passivation layer 720 is formed, the possibility of crack occurrence decreases. Also, as shown in FIGS. 7*a* and 7*b*, since the side portions of the second metal line 520 are formed with a slope, the possibility in crack occurrence decreases remarkably.

In the meanwhile, the forming processes of the second metal line 520, the inorganic insulating film 710 and the passivation layer 720 can be formed by the same method as that of the first metal line 510.

Thus, although the first and second metal lines 510 and 520 according to the present invention have a thickness greater than a thickness of the lines in the background art, they have a height difference less than a height difference in the background art, due to the existence of the fine grooves. As a result, the quality of the upper films formed on the metal lines 510 and 520, i.e., the inorganic insulating film 610 and the passivation layer 720 is enhanced and the reliability in the manufacturing process is also improved.

In addition, the aperture ratio of the pixels and the luminance are enhanced, so that a high resolution can be obtained.

Further, it becomes possible to form the metal lines of the low resistance characteristic which is required in manufacturing a large-sized LCD without lowering of the aperture ratio or increase in the height difference.

In particular, in case the substrate of the present invention is used, a high quality large-sized LCD can be produced and a high resolution even in a small-sized LCD can be obtained.

The foregoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of manufacturing a substrate for a liquid crystal display, the method comprising:
    forming a plurality of first line-shaped fine grooves parallel to each other in a lengthwise direction and a plurality of second line-shaped fine grooves parallel to each other in a width direction on the substrate;
    forming an inorganic insulating film on the substrate including the first and second line-shaped fine grooves;
    forming a plurality of gate lines within the first line-shaped fine grooves;
    forming a plurality of data lines that contacts an upper surface of the inorganic insulating film within the second line-shaped fine grooves; and
    forming a passivation layer on the substrate including the data lines,
    wherein each gate line is extended to a first portion higher than a surface of the substrate, and is formed to contact an entirety of a top surface and a sidewall surface within the corresponding first line-shaped fine groove,
    wherein each data line is extended to a second portion higher than a surface of the inorganic insulating film, and
    wherein the first line-shaped fine grooves on which the gate lines are formed and the second line-shaped fine grooves on which the data lines are formed are separately formed in the substrate.

* * * * *